(12) United States Patent
Wilson

(10) Patent No.: US 8,506,248 B2
(45) Date of Patent: Aug. 13, 2013

(54) WIND TURBINE ROTOR BLADE WITH PASSIVELY MODIFIED TRAILING EDGE COMPONENT

(75) Inventor: Megan M. Wilson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/267,121

(22) Filed: Oct. 6, 2011

(65) Prior Publication Data

US 2012/0141272 A1  Jun. 7, 2012

(51) Int. Cl.
*F03D 1/06* (2006.01)

(52) U.S. Cl.
USPC ............................................. 416/23; 416/41

(58) Field of Classification Search
USPC .................. 415/108, 114, 175, 176, 177, 178; 416/23, 24, 147, 132 B, 132 R, 41, 117, 118, 416/240
See application file for complete search history.

(56) References Cited

U.S. PATENT DOCUMENTS

| | | | |
|---|---|---|---|
| 4,082,479 A * | 4/1978 | Rangi et al. ..................... 416/23 |
| 5,181,678 A | 1/1993 | Widnall et al. |
| 5,193,978 A * | 3/1993 | Gutierrez ........................ 416/24 |
| 5,320,491 A | 6/1994 | Coleman et al. |
| 5,527,152 A * | 6/1996 | Coleman et al. ................ 416/23 |
| 5,570,859 A * | 11/1996 | Quandt ......................... 244/213 |
| 5,895,015 A * | 4/1999 | Saiz .............................. 244/215 |
| 6,015,115 A | 1/2000 | Dorsett et al. |
| 6,164,599 A | 12/2000 | Piening et al. |
| 6,168,379 B1 | 1/2001 | Bauer |
| 6,199,796 B1 | 3/2001 | Reinhard et al. |
| 6,769,873 B2 | 8/2004 | Beauchamp et al. |
| 7,059,833 B2 * | 6/2006 | Stiesdal et al. .................. 416/41 |
| 7,632,068 B2 | 12/2009 | Bak et al. |
| 7,802,759 B2 | 9/2010 | Ishikawa et al. |
| 7,922,450 B2 | 4/2011 | Narasimalu |
| 2006/0145031 A1 | 7/2006 | Ishikawa et al. |
| 2008/0292461 A1 * | 11/2008 | Stiesdal ........................ 416/147 |
| 2009/0028704 A1 * | 1/2009 | Rebsdorf et al. ................ 416/23 |
| 2009/0028705 A1 | 1/2009 | Meldgaard et al. |
| 2009/0074573 A1 * | 3/2009 | Rebsdorf et al. ................ 416/23 |
| 2010/0127504 A1 | 5/2010 | Hancock |
| 2012/0134817 A1 | 5/2012 | Bagepalli et al. |
| 2012/0141272 A1 * | 6/2012 | Wilson ........................... 416/23 |

FOREIGN PATENT DOCUMENTS

| | | |
|---|---|---|
| WO | WO 2007/079855 | 7/2007 |
| WO | WO 2008/003330 A1 | 1/2008 |
| WO | WO 2009/061478 A1 | 5/2009 |

* cited by examiner

*Primary Examiner* — Edward Look
*Assistant Examiner* — Christopher R Legendre
(74) *Attorney, Agent, or Firm* — Dority & Manning, P.A.

(57) ABSTRACT

A wind turbine rotor blade includes a root portion and an airfoil portion extending from the root portion and defined by a leading edge and a trailing edge. The airfoil portion further includes a main foil section and a trailing edge section that is pivotally connected to the main foil section along a span-wise extending hinge line. A passive torsion element is coupled between the main foil section and the trailing edge section. The torsion element is biased to a neutral position wherein the trailing edge section is pivoted chord-wise to a low wind speed position relative to the main foil section. The trailing edge section is self-actuating from the low wind speed position to an increased wind speed position relative to the main foil section as a function of the biasing force of the torsion element and wind speed over the airfoil section.

18 Claims, 4 Drawing Sheets

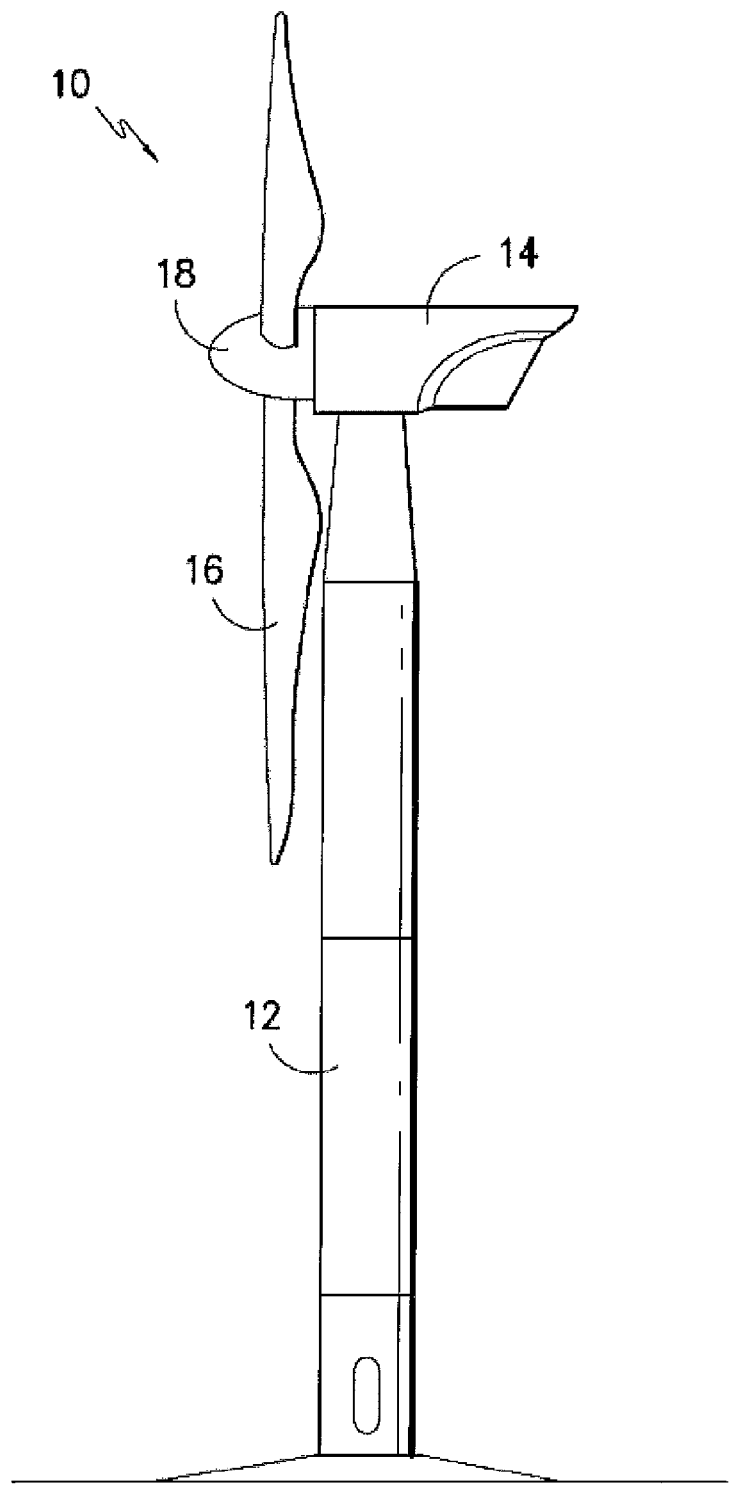
*Fig. -1-*
*Prior Art*

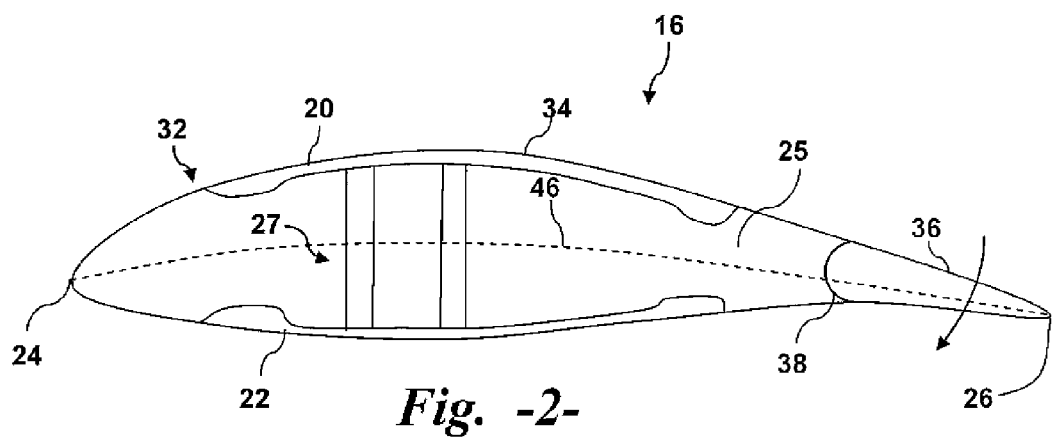
Fig. -2-
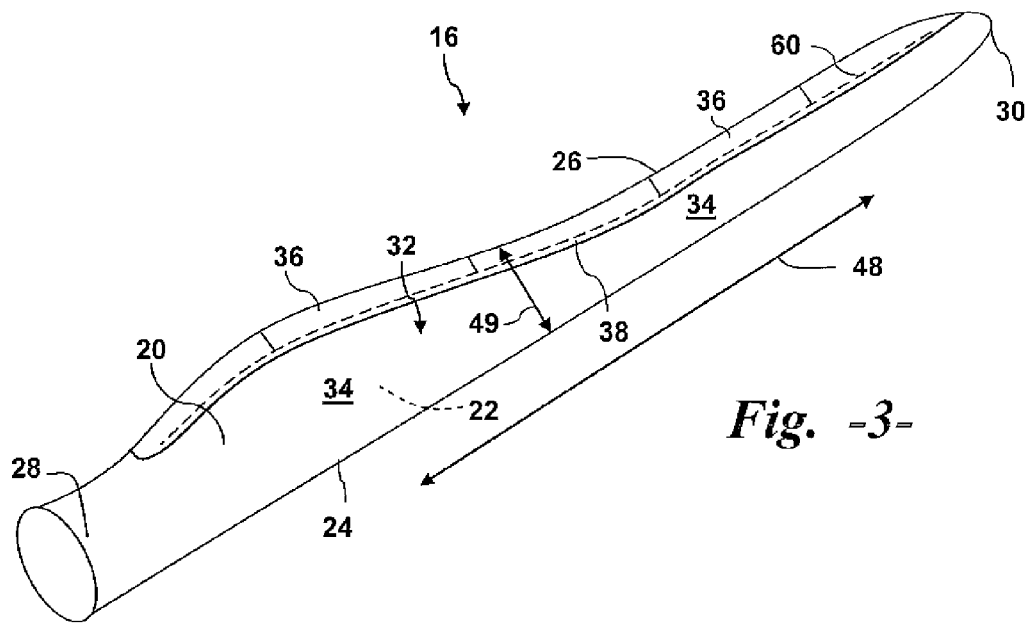
Fig. -3-

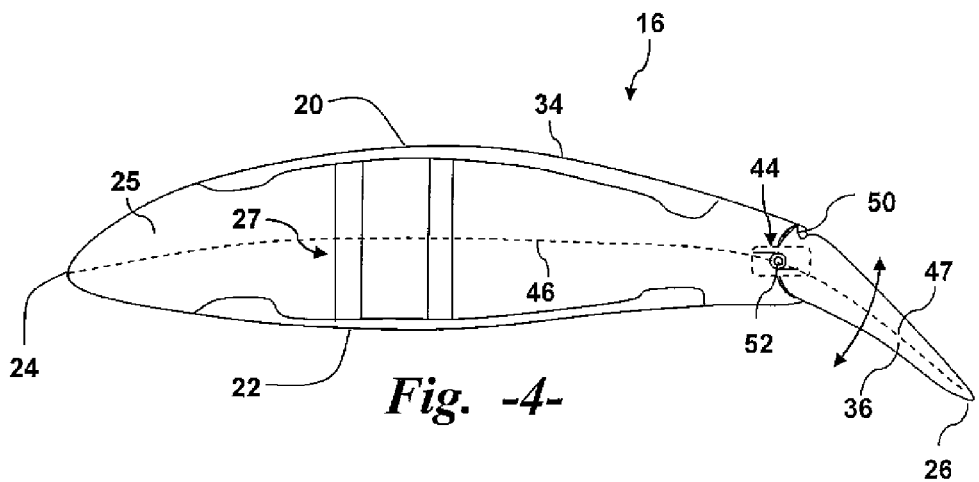
Fig. -4-
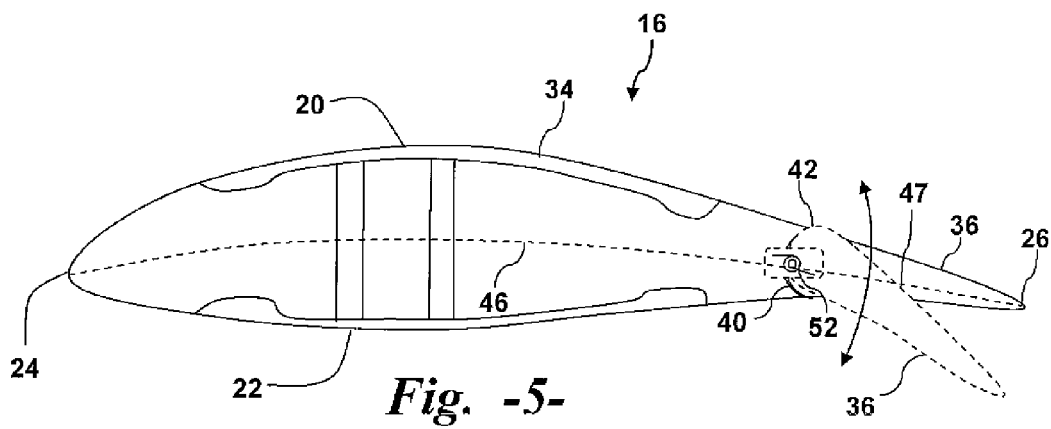
Fig. -5-

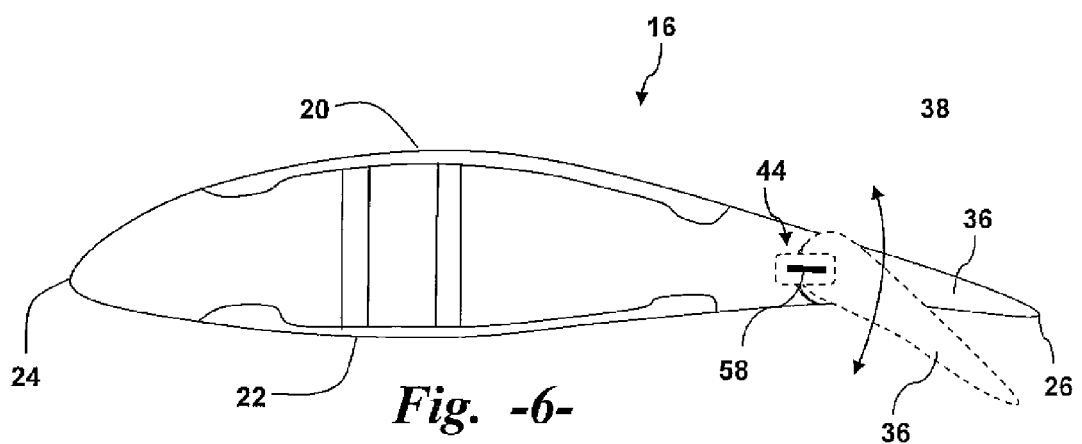
Fig. -6-

WIND TURBINE ROTOR BLADE WITH PASSIVELY MODIFIED TRAILING EDGE COMPONENT

FIELD OF THE INVENTION

The present subject matter relates generally to wind turbines, and particularly to wind turbine rotor blades having a passive trailing edge component that reacts and changes position as a function of changing wind conditions.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine blades are generally designed for an optimal wind speed and, thus, are less efficient at other wind speeds. Prior attempts to increase the effective range of wind speeds for the turbine blades have involved active systems that modify or change the aerodynamic profile of the blade by moving or adjusting appendages, flaps, or other control surfaces attached to the blades in an active feedback control loop. Electro-mechanical systems are typically incorporated within the blade for moving the control surfaces. Reference is made for example to U.S. Pat. No. 7,922,450, which describes a blade with a trailing edge section that is moved with an internal piezo-electric actuator in response to aerodynamic loads on the blade.

These systems have also been introduced for load control purposes, wherein the load on the blades is reduced in high wind conditions by changing the aerodynamic profile of the blade via the active control surfaces. Efforts have been made to increase the energy output of wind turbines by increasing the length and surface area of the rotor blades. However, the magnitude of deflection forces and loading of a rotor blade is generally a function of blade length, along with wind speed, turbine operating states, blade stiffness, and other variables. This increased loading not only produces fatigue on the rotor blades and other wind turbine components but may also increase the risk of a sudden catastrophic failure of the rotor blades, for example when excess loading causes deflection of a blade resulting in a tower strike.

Load control is thus a crucial consideration in operation of modern wind turbines. Besides active pitch control systems, it is also known to vary the aerodynamic characteristics of the individual rotor blades as a means of load control, for example with controllable vortex elements, flaps, tabs, and the like configured on the blade surfaces. For example, U.S. Pat. No. 6,972,498 describes various wind turbine blade configurations wherein a retractable extension is provided on a base blade segment to reduce the effective length of the blade in high load conditions. In a particular embodiment, the blade extension is hinged to the base blade segment and jackknifes between a fully extended position and a fully retracted position wherein the blade extension folds into the base blade segment.

Accordingly, the industry would benefit from an improved wind turbine blade design that has an increased effective wind speed range yet avoids the expense and relatively complicated components associated with active enhancement systems.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine rotor blade includes root portion and an airfoil portion extending from the root portion and defined by a leading edge and a trailing edge of the blade. The airfoil portion further includes a main foil section and a trailing edge section that is pivotally connected to the main foil section along a span-wise extending hinge line. A passive torsion element is coupled between the main foil section and the trailing edge section. The torsion element is biased to a neutral position wherein the trailing edge section is pivoted chord-wise to a low wind speed position relative to the main foil section. In this low wind speed position, the blade has an aerodynamic profile that is more efficient at capturing energy at reduced wind speeds. As wind speed increases, the trailing edge section is self-actuating from the low wind speed position to an increased wind speed position relative to the main foil section against the biasing force of the torsion element as a function of wind speed over the airfoil section. As the wind speed increases, the trailing edge section moves further away from the neutral low wind speed position to a high wind speed position.

In a particular embodiment, the blade includes a plurality of the pivotally connected trailing edge sections aligned span-wise along the trailing edge, with each of these trailing edge sections including a respective passive torsion element. In an alternate embodiment, a single trailing edge section may extend along the blade and include one or more of the torsion elements.

The torsion element may be configured such that at a design optimum wind speed for the blade, the trailing edge section is in an in-line position with the main foil section with respect to a chord-wise axis of the blade. The trailing edge section is thus variably positionable anywhere between the low wind speed position and the in-line position. It may be desired in this embodiment to include a stop defined between the trailing edge section and main foil section that prevents movement of the trailing edge section beyond the in-line position.

The torsion element may be variously configured. For example, in one embodiment, the torsion element is a torsion spring having one leaf connected to the stationary main foil section and the other leaf connected to the pivotal trailing edge section. In an alternate embodiment, the torsion element may be a resilient member, such as a homogeneous elastomeric material, that is preformed into a neutral position. The resilient member may be in the form of a strip member that extends span-wise between the trailing edge section or sections and the main foil section. The strip member may be continuous or intermittent.

It should be appreciated that the invention is not limited to any particular size or chord dimension of the trailing edge section, and that such dimensions may vary from the root to the tip of the blade, or between different trailing edge sections. In certain embodiments, the main foil section extends at least 50% of the blade chord (taken from the leading edge towards the trailing edge) along the span of the blade. Thus, in this embodiment, the trailing edge section of the blade is less than 50% of the blade chord.

The present invention also encompasses any manner of wind turbine configuration having one or more rotor blades configured with a trailing edge extension as set forth herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a cross-sectional view of an embodiment of a wind turbine rotor blade in accordance with aspects of the invention;

FIG. 3 is a perspective view of an embodiment of a wind turbine rotor blade in accordance with aspects of the invention;

FIG. 4 is a cross-sectional view of an embodiment of a wind turbine rotor blade incorporating a passively actuated trailing end section;

FIG. 5 is a cross-sectional view of an alternative embodiment of a wind turbine rotor blade incorporating a passively actuated trailing end section; and FIG. 6 is a cross-sectional view of still another embodiment of a wind turbine rotor blade incorporating a passively actuated trailing end section.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12 supported on a base foundation, a nacelle 14 mounted on the tower 12, and a rotor hub 18 that is coupled to power-generating equipment contained within the nacelle 14. The rotor 18 includes rotor blades 16 coupled to and extending radially outward from the hub 20, for example three rotor blades 16 as depicted in the figure. However, in an alternative embodiment, the rotor 18 may include more or less than three rotor blades 16.

Referring to FIG. 2, each of the wind turbine blades 16 includes an upper shell member 20 and a lower shell member 22, with an internal cavity 25 defined between the shell members. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at respective bond lines along the leading edge 24 and trailing edge 26. Any manner of internal structural members 27, such as a shear web, spar caps, and the like, may also be provided.

The rotor blades 16 may generally have any suitable length that enables the wind turbine 10 to function according to design criteria. For example, the rotor blades 16 may have a length ranging from about 9 meters (m) to about 100 m. The rotor blades 16 are spaced about the hub 18 to facilitate transfer of kinetic energy from the wind into usable mechanical energy, and subsequently, electrical energy. Specifically, the hub 18 may be coupled to an electric generator (not illustrated) disposed within the nacelle 14 for production of electrical energy. Further, the rotor blades 16 are mated to the hub 18 by coupling the blade root portion 28 to the hub 18 at a plurality of load transfer regions. Thus, any loads induced to the rotor blades 16 are transferred to the hub 18 via the load transfer regions.

Referring to FIGS. 2 and 3, an embodiment of a wind turbine rotor blade 16 includes an airfoil portion 32 that extends from the root 28 to the blade tip 30. The airfoil portion 32 is defined by the upper 20 and lower 22 shell members between the leading edge 24 and trailing edge 26. The airfoil section 32 is divided into a main foil section 34 and a trailing edge section 36. A hinge line 38 delineates the main foil section 34 from the trailing edge section 36. Thus, the trailing edge section 36 may be defined as the portion of the airfoil 32 that extends from the trailing edge 26 to the hinge line 38. The trailing edge section 36 is pivotally connected to the main foil section 34 along the span-wise extending hinge line 38 (with the span-wise direction indicated by the arrow 48 in FIG. 3).

Referring to FIGS. 4 and 5, a passive torsion element 44 is coupled between the main foil section 34 and the trailing edge section 36. This torsion element 44 is biased to a neutral position indicated in FIG. 4 wherein the trailing edge section 36 is pivoted chord-wise to a low wind speed position relative to the main foil section 34 (with the chord-wise direction indicated by the arrow 49 in FIG. 3). Referring to FIG. 4, the blade 16 has a chord axis 46. In the neutral position of the trailing edge section 36, the axis 47 of the trailing edge section 36 is angled or pivoted towards the lower shell member 22 (which may be considered as the pressure side of the blade 16). Thus, the trailing edge section 36 is pivoted in a chord-wise direction relative to the main foil section 34.

The neutral position of the trailing edge section 36 in FIG. 4 corresponds to a low wind speed position of the trailing edge section 36 wherein the aerodynamic profile of the blade 16 is modified from the profile that the blade is designed for at an optimum wind speed (FIG. 2) in order to better capture wind energy at lower wind speeds. From this neutral low wind speed position, the trailing edge section 36 self-actuates to an increased wind position relative to the main foil section 34 against the biasing force of the torsion element 44 as a function of wind speed. As wind speed (and load) on the blade 16 increases, so does the pivotal position of the trailing edge section 36 relative to the main foil section 34.

FIG. 5 depicts an embodiment of the wind turbine blade 16 wherein the trailing edge section 36 is pivoted to an increased wind speed position (in solid lines) relative to the main foil section 34. In this position, the axis 47 of the trailing edge section 36 is aligned with the axis 46 of the main foil section 34. This position of the trailing edge section 36 may correspond to an overall aerodynamic profile of the wind turbine blade 16 that is designed for an optimum wind speed. It should be appreciated that the increased wind speed position of the trailing edge section 36 can correspond to any position of the section 36 between the neutral position depicted in FIG. 4 and the optimum wind speed position depicted in FIG. 5 as a function of wind speed.

Referring to FIG. 4, it may be desired in certain embodiments to incorporate a stop mechanism 50 between the trailing edge section 36 and main foil section 34 that prevents the trailing edge section 36 from pivoting beyond the optimum wind speed position depicted in FIG. 5. This stop 50 may be any manner of shoulder, block, or any other engaging structure between the trailing edge section 36 and the main foil portion 34. For example, as depicted in FIG. 4, the stop 50 may simply be defined as a shoulder 50 on the main foil section 34 that prevents the trailing edge section 36 from pivoting beyond the position illustrated in FIG. 5.

In alternate embodiments, the "stop" function may be an inherent feature of the passive torsion element. For example, the torsion element may have a range of motion that defines the stop position. In the case of a torsion spring 52 (FIG. 4), for example, the spring may be configured so as to have a maximum torque at the stop position.

Referring again to FIGS. 4 and 5, the trailing edge section 36 may be pivotally attached to the main foil section 34 by any suitable hinge mechanism. For example, the hinge mechanism may include a sliding frictional configuration between a rounded face 42 defined on the trailing edge section 36 and a correspondingly shaped recess or seat 40 defined in the main foil section 34. The passive torsion element 44 may couple the two components together along the interface of the seat 40 and face 44 along the span-wise length of the blade 16 (FIG. 3). It should be appreciated that any manner of suitable hinge mechanism may be utilized in this regard to enable the pivotal motion between the trailing edge section 36 and main foil section 34 as set forth herein.

Referring to FIG. 3, it should be appreciated that the invention encompasses various configurations of a blade 16 wherein the trailing edge section 36 may be configured as a single or plurality of components along the span-wise length of the trailing edge 26. For example, in FIG. 3, a plurality of individual trailing edge sections 36 are depicted. Each of these sections 36 may be independently coupled and actuated to an individual respective passive torsion element 44. In an alternative embodiment, a single trailing edge section 36 may span along a length of the trailing edge 26 and be coupled to one or more of the passive torsion elements 44.

The torsion element 44 may be variously configured within the scope and spirit of the invention. For example, as depicted in FIGS. 4 and 5, the torsion element 44 is a torsion spring 52 having a leaf engaged with the main foil section 34 and an opposite leaf engaged with the trailing edge section 36 to define the neutral position of the edge section 36 as depicted in FIG. 4. The trailing edge section 36 pivots to the position depicted in FIG. 5 against the bias of the torsion spring 52. A plurality of the torsion springs 52 may be spaced along the trailing edge section depending on any number of factors, such as weight of the trailing edge section, load expected on the trailing edge section 36, length of the section 36, and so forth.

The embodiment of FIG. 6 depicts an alternative embodiment of the passive torsion element 44, wherein the passive torsion force is provided by a resilient member 58. This member 58 may be, for example, a strip 60 (FIG. 3) of resilient elastomeric material, such as a rubber-like material, that is pre-formed into a neutral shape to provide the low wind speed position to the trailing edge section 36 depicted by the dashed lines in FIG. 6. For example, the resilient member 58 may be a longitudinally extending strip member 60 having a pre-formed arcuate or curved cross-sectional profile, wherein the profile changes to a relatively flat shape as depicted in FIG. 6 as the trailing edge 36 pivots towards the in-line position.

It should be readily appreciated that any number or combination of passive torsion elements may be utilized to provide the passive torsion force between the main foil section 34 and pivotal trailing edge section 36 in accordance with the scope and spirit of the invention.

It should also be appreciated that the present invention encompasses any manner or configuration of a wind turbine that incorporates one or more rotor blades with a passively actuated trailing edge section as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
    a root portion;
    an airfoil portion extending from said root portion and defined by a leading edge and a trailing edge;
    said airfoil portion further comprising a main foil section having a suction side surface and a pressure side surface, and a trailing edge section that is pivotally connected to said main foil section along a span-wise extending hinge line interface;
    a passive torsion element coupled between said main foil section and said trailing edge section, said torsion element biased to a neutral position wherein said trailing edge section is pivoted chord-wise to a low wind speed position towards said pressure side surface of said main foil section; and
    said trailing edge section being self-actuating from said low wind speed position to an increased wind speed aerodynamic position relative to said main foil section as a function of the biasing force of said passive torsion element and wind speed over said airfoil section; and
    wherein said hinge line interface comprises a rounded face defined on said trailing edge section that is nested within a rounded recess defined in said main foil section.

2. The wind turbine blade as in claim 1, comprising a plurality of said pivotally connected trailing edge sections aligned span-wise along said trailing edge, each of said trailing edge sections comprising a respective said passive torsion element.

3. The wind turbine blade as in claim 1, wherein said torsion element is configured such that at a design optimum wind speed for said blade, said trailing edge section is in an in-line position with said main foil section with respect to a chord-wise axis of said blade.

4. The wind turbine blade as in claim 3, wherein said increased wind speed position is defined between said low wind speed position and said in-line position.

5. The wind turbine blade as in claim 4, further comprising a stop defined between said trailing edge section and said main foil section that prevents movement of said trailing edge section beyond said in-line position.

6. The wind turbine blade as in claim 1, wherein said torsion element comprises a torsion spring.

7. The wind turbine blade as in claim 1, wherein said torsion element comprises a resilient member preformed into said neutral position.

8. The wind turbine blade as in claim 1, wherein said main foil section extends at least 50% of the blade chord taken from said leading edge along the span of said blade.

9. A wind turbine rotor blade, comprising:
a root portion;
an airfoil portion extending from said root portion and defined by a leading edge and a trailing edge;
said airfoil portion further comprising a main foil section and a trailing edge section that is pivotally connected to said main foil section along a span-wise extending hinge line, said hinge line delineating said main foil section from said trailing edge section;
a passive torsion element coupled between said main foil section and said trailing edge section, said torsion element biased to a neutral position wherein said trailing edge section is pivoted chord-wise to a low wind speed position relative to said main foil section;
said trailing edge section being self-actuating from said low wind speed position to an increased wind speed position relative to said main foil section as a function of the biasing force of said passive torsion element and wind seed over said airfoil section; and
wherein said resilient member is a strip member that extends span-wise between said trailing edge section and said main foil section.

10. A wind turbine, comprising:
a plurality of rotor blades, each said rotor blade having a root portion connected to a rotor hub and an airfoil portion extending radially outward from said root portion and defined by a leading edge and a trailing edge;
said airfoil portion further comprising a main foil section having a pressure side surface and a suction side surface, and a trailing edge section that is pivotally connected to said main foil section along a span-wise extending hinge line interface;
a passive torsion element coupled between said main foil section and said trailing edge section, said torsion element biased to a neutral position wherein said trailing edge section is pivoted chord-wise to a low wind speed position towards said pressure side surface of said main foil section; and
said trailing edge section being self-actuating from said low wind speed position to an increased wind speed aerodynamic position relative to said main foil as a function of the biasing force of said passive torsion element and wind speed over said airfoil section; and
wherein said hinge line interface comprises a rounded face defined on said trailing edge section that is nested within a rounded recess defined in said main foil section.

11. The wind turbine as in claim 10, wherein said rotor blades comprise a plurality of said pivotally connected trailing edge sections aligned span-wise along said trailing edge, each of said trailing edge sections comprising a respective said passive torsion element.

12. The wind turbine as in claim 10, wherein said torsion element is configured such that at a design optimum wind speed for said blades, said trailing edge section is in an in-line position with said main foil section with respect to a chord-wise axis of said blade.

13. The wind turbine as in claim 12, wherein said increased wind position is defined between said low wind speed position and said in-line position.

14. The wind turbine as in claim 13, further comprising a stop defined between said trailing edge section and said main foil section that prevents movement of said trailing edge section beyond said in-line position.

15. The wind turbine as in claim 10, wherein said torsion element comprises a torsion spring.

16. The wind turbine as in claim 10, wherein said torsion element comprises a resilient member preformed into said neutral position.

17. The wind turbine as in claim 16, wherein said resilient member is a strip member that extends span-wise between said trailing edge section and said main foil section.

18. The wind turbine as in claim 10, wherein said main foil section extends at least 50% of the blade chord taken from said leading edge along the span of said blade.

* * * * *